(12) United States Patent
Brice, Jr. et al.

(10) Patent No.: US 6,253,224 B1
(45) Date of Patent: Jun. 26, 2001

(54) METHOD AND SYSTEM FOR PROVIDING A HARDWARE MACHINE FUNCTION IN A PROTECTED VIRTUAL MACHINE

(75) Inventors: Frank W. Brice, Jr., Hurley; Eugene P. Hefferon; Casper A. Scalzi, both of Poughkeepsie; Richard P. Tarcza, Kingston, all of NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/046,912

(22) Filed: Mar. 24, 1998

(51) Int. Cl.$^7$ ............................................. G06F 17/00
(52) U.S. Cl. ..................................... 709/1; 711/208
(58) Field of Search .......................... 709/1, 100–108; 711/203–209

(56) References Cited

U.S. PATENT DOCUMENTS

| | | |
|---|---|---|
| 4,300,192 | 11/1981 | Couleur et al. ............ 711/153 |
| 5,144,551 | 9/1992 | Cepulis ...................... 711/163 |
| 5,163,147 | 11/1992 | Orita ............................ 707/9 |
| 5,210,844 | 5/1993 | Shimura et al. ............ 711/153 |
| 5,319,760 * | 6/1994 | Mason et al. ............... 711/208 |
| 5,321,825 | 6/1994 | Song ............................ 711/163 |
| 5,345,590 | 9/1994 | Ault et al. .................... 709/1 |
| 5,396,609 | 3/1995 | Schmidt et al. ............ 711/163 |
| 5,416,921 | 5/1995 | Frey et al. .................... 714/11 |
| 5,423,044 | 6/1995 | Sutton et al. ................ 710/200 |
| 5,522,075 * | 5/1996 | Robinson et al. ............ 709/100 |
| 5,564,040 | 10/1996 | Kubala ........................ 711/173 |
| 5,761,477 * | 6/1998 | Wahbe et al. ................ 709/1 |

OTHER PUBLICATIONS

Microsoft Systems Journal, Jul.–Aug. 1992, "A Grant Tour of Windows NT: Portable 32–bit Multiprocessing Comes to Windows" by H. Cluster—pp. 17–31.
IBM Technical Disclosure Bulletin—vol. 39, No. 12, Dec. 1996 pp. 123–124.

* cited by examiner

*Primary Examiner*—St. John Courtenay, III
(74) *Attorney, Agent, or Firm*—Floyd A. Gonzalez; Marc A. Ehrlich

(57) ABSTRACT

This invention describes a method and system for virtualizing an internal capability of a computing system; specifically, the invention describes a method and system for establishing a virtual machine containing a programmed hardware-machine function that is normally executed natively as proprietary internal code in its own hardware environment, a Central Electronics Complex (CEC) or logical partition of a CEC. The code resides in a separate hardware domain of the CEC called the Service Element (SE). The IBM VM/ESA (VM) operating system requests the SE to transfer a copy of the code into a virtual machine that VM has initialized, where the machine function is provided (in the current embodiment) as an isolated and encapsulated part of a virtual Parallel Sysplex system comprising multiple virtual CECs in a testing environment.

27 Claims, 11 Drawing Sheets

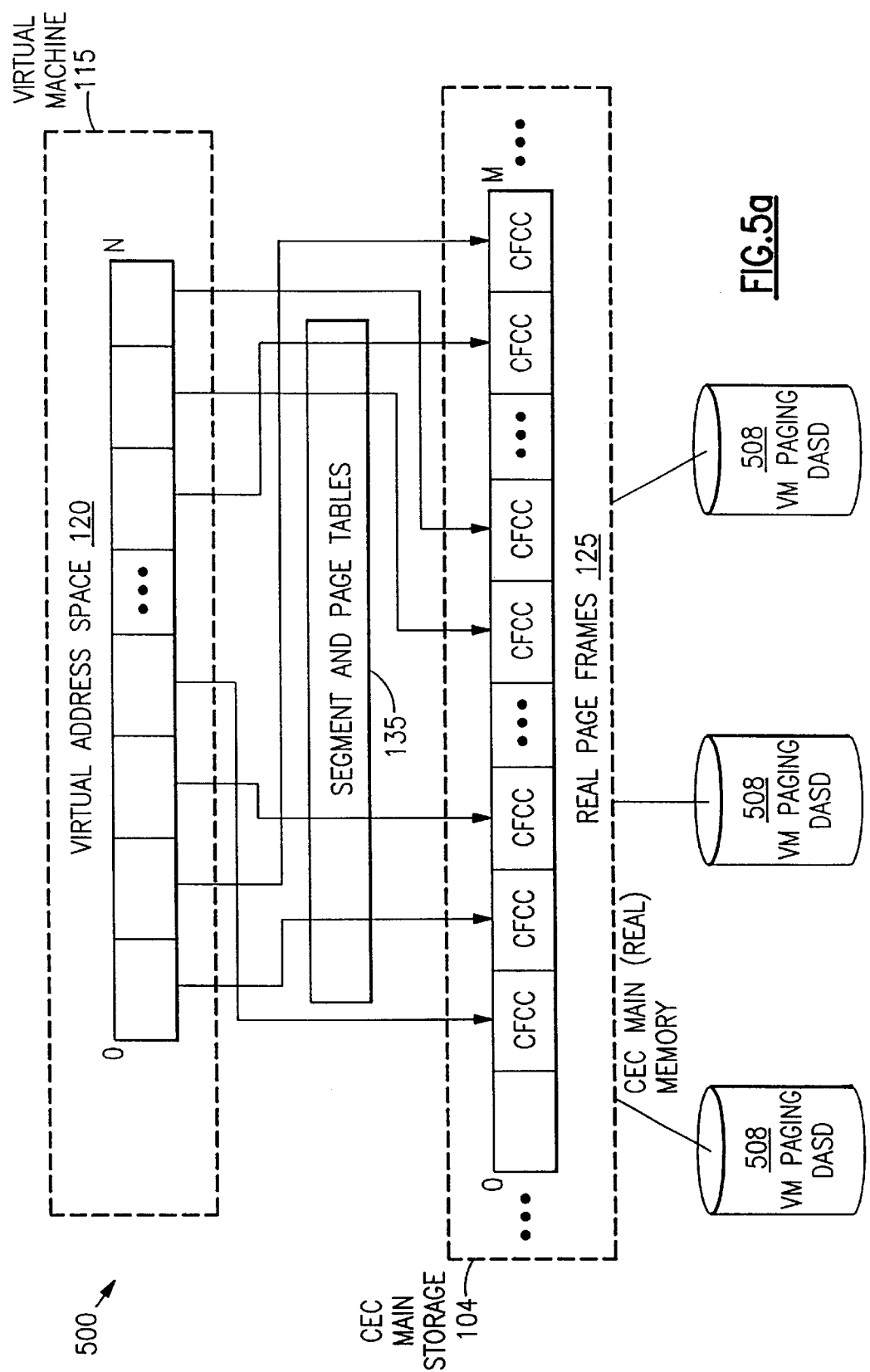

METHOD AND SYSTEM FOR PROVIDING A HARDWARE MACHINE FUNCTION IN A PROTECTED VIRTUAL MACHINE

FIELD OF THE INVENTION

The present invention relates generally to the field of computer system design and in particular to a method and system for providing an internal machine hardware function, typically implemented in the main storage of a physical hardware-based computing system, in a virtual machine of a computing system. The invention provides an operational interface between a first computer system environment and a separate and secure storage environment, which is not available for the execution of customer programs. By implementing the operational interface, execution of a microcode-based hardware machine function, initially situated in the secured storage environment is provided to the user through one or more isolated virtual machines of the first computer system environment, so as to provide its functionality to programs running in other portions of the first computer system environment.

BACKGROUND OF THE INVENTION

Many modern computer systems implement various types of clustered architectures. In particular, the Parallel Sysplex clustered system offered by International Business Machines Corporation (IBM) (Parallel Sysplex and IBM are registered trademarks of International Business Machines Corporation, the present assignee hereof) comprise one or more S/390 servers coupled via intersystem links to one or more Coupling Facilities (CFs) which provide a structured, shared electronic storage for the coupled servers (S/390 is a registered trademark of IBM).

Establishment of a Parallel Sysplex computing system can be a work-intensive task which involves the acquisition and customization of new hardware and software. It has therefore been found advantageous to offer customers the opportunity to determine the benefits derived from the Parallel Sysplex system implementation by providing an emulated Parallel Sysplex computing environment for customer testing.

The foregoing problem has been previously addressed by providing a facility whereby the function of the Parallel Sysplex system can be emulated within a single hardware machine. In U.S. Pat. No. 5,564,040 to Kubala (assigned to the present assignee and incorporated herein by reference), the program code for performing the functions of the Coupling Facility is loaded into a maximum of two logical partitions of main storage in the hardware machine. In the Kubala patent, the (server mode) CF memory partitions are non-user accessible and provide Coupling Facility functions by interacting with user-accessible (non-server mode) memory partitions to simulate the function of a Parallel Sysplex system. While the Kubala patent does provide a simulated Parallel Sysplex system, it is limited to implementations including only two simulated Coupling Facilities and requires the allocation of a logical partition of main storage for each of these Coupling Facility instances.

In accordance with the foregoing it is clear that a solution which provides a customer with the ability to simulate highly complex Parallel Sysplex implementations including up to eight Coupling Facilities in a single Parallel Sysplex system, or alternatively to test multiple Parallel Sysplex systems on a single hardware machine without requiring the actual hardware systems or storage necessary for the real hardware-based implementation would prove advantageous to such customers. Moreover, it would be further beneficial to provide this simulated hardware function within a software environment having pre-existing debugging facilities with which the customer could more-effectively test the virtualized hardware implementation.

In response to these identified user requirements, via the facilities of the present invention, the services of the Coupling Facility or any other microcode-based hardware machine function can now be provided in a virtual machine of VM/ESA (VM), which is referred to as a virtual machine hypervisor or supervisor of other operating systems (VM/ESA is a registered trademark of IBM). Consequently, customers may test and debug the programs that are to use Coupling Facility services in a simulated Parallel Sysplex system comprising virtual machines rather than real machines.

This virtualization, by utilizing pageable storage, also allows unlimited multiple copies of the function to exist within a single computing system, each in its own virtual machine. Accordingly, the VM operating system allows a user to emulate one or more complete, independent simulated Parallel Sysplex systems, each with one or more CFs, in a single machine or logical partition thereof. This enables customer testing of large complex multisystem configurations without requiring those customers to acquire the actual hardware required for the configurations, or to possess the larger real storage required for such testing.

An additional advantage of implementing the simulated hardware machine function within the VM operating system is the availability within VM of existing debugging facilities and the ease of virtual machine re-configuration therein of this virtual Parallel Sysplex implementation. Users of the VM operating system have long utilized these facilities to test other software-based features, and accordingly this familiarity serves to aid in the testing of the virtual Parallel Sysplex system.

SUMMARY OF THE INVENTION

Advantageous features offered via the present invention address the foregoing problems and shortcomings of the prior art, and in particular, include implementation of an operational interface for virtualizing an internal hardware-based machine capability of a computing system. The interface is implemented between the VM/ESA (VM) operating-system hypervisor, executing on the main processors of a machine, or Central Electronics Complex (CEC), and the Service Element (SE) of the CEC, a separate hardware and program-execution domain within the CEC that is not accessible to users of the system and is not available for the execution of user programs. This interface provides a facility whereby a programmed hardware-based machine function called the Coupling Facility (CF), which typically executes in the main storage of a single hardware machine or logical partition thereof, is established for execution in one or more isolated virtual machines of VM, where it can be used to provide service to programs in other virtual machines in the same hardware machine or logical partition through a VM simulation of a coupling-hardware interface.

In general, a hardware machine function may be implemented at the normal architected programming-interface level of the hardware machine, yet be an integral part of the machine definition and not distributed as a programming product. An example of such an implementation is the CF function, the virtualization of which forms the basis for the subsequent detailed description section of this patent. The program code providing this function resides in the Service Element (SE) of the hardware system.

The Coupling Facility is implemented in proprietary microcode termed Coupling Facility Control Code (CFCC), which is classified by IBM as Licensed Internal Code (LIC) and not intended for access by customers using the computer system. Accordingly, a further feature of the present invention creates a new class of "encapsulated" virtual machines in VM to protect the proprietary nature of the implementation of the LIC function from unauthorized access in a virtual machine. This protection is additionally important since a violation of the integrity of the LIC function can have a negative effect on the operation of the multiple computing systems comprising a virtual Parallel Sysplex system, potentially creating difficult debugging situations.

In contrast to typical unrestricted virtual machines in VM which are available for logon and full use by a user, an encapsulated virtual machine permits no such logon and regular use. Moreover, the system commands which are normally available to virtual-machine users are restricted in an encapsulated virtual machine. Requests for the services of an encapsulated virtual machine, which may be issued by users or programs running on other virtual machines, are provided to the encapsulated virtual machines and are concurrently used to trigger testing of the encapsulated virtual machine environment to ensure the continued non-violation of the encapsulation.

The transformation of the hardware-based machine function (which in the preferred embodiment is the Coupling Facility function, but could include any type of machine function embodied in programmed code and typically executed by a hardware machine) to provide for its execution in a virtual machine is enabled through use of an address list created by VM and transferred, using machine facilities, from CEC main storage to the private storage of the SE. The address list is utilized by VM and the main processors of the CEC as Segment and Page Tables for use by Dynamic Address Translation (DAT) hardware during operation of a virtual machine. The same address list is used by the SE as a two-level list of real-main-storage locations, in virtual-address order, identifying the real-page-frame locations into which the machine-function code (i.e., the LIC) is to be transferred by the SE, which itself has no access to the DAT hardware.

The invention provides for the creation of a test environment on a single hardware machine in which VM can support one or more virtual Parallel Sysplex systems. Each virtual machine operates as a separate virtual Coupling Facility, allowing testing of large, complex Parallel Sysplex configurations without the need for all of the hardware comprising the eventual real Parallel Sysplex system. Advantageously, since the resultant virtual-machine Coupling Facilities are in pageable storage, the large cumulative amount of electronic storage required for the physical Parallel Sysplex implementation(s) is not required for the testing of the virtual Parallel Sysplex system.

The SE is a separate, unique computational environment within an S/390 CEC. The SE need not utilize an S/390 operating environment when performing its own functions. The SE contains its own processor, memory and direct-access storage devices (DASD) which operate asynchronously to the function of the CEC. The storage capacity of the SE is used to store program and data elements that. are required by the SE to support the main computational engines of the CEC.

One of the services provided by the SE is the establishment, within a defined environment, of a machine function, such as the CFCC. Heretofore, these defined environments have been either a physically distinct CEC, or a logical partition of a CEC as in the case of the aforementioned Kubala patent. The establishment of the function is actuated via a request through an interface defined for such requests. The SE processor performs such requests on its own engine in response to requests for service. A hardware interface is provided for the transfer of data from the storage domain of the SE to the main storage of the computing system, where the transferred data is then accessible by the main processors of the system as data or programs to be executed.

In a preferred embodiment the present invention implements a transformation and loading process which is different from the processes used to establish the hardware machine function in its native environment. Previously, the user program would reside in one physical CEC or logical partition, and call for the services of the established CF function in another physical system (CEC) or a physically isolated logical partition of memory within the same CEC. In accordance with the present invention, the user program resides in a virtual machine, and calls another virtual machine including the established hardware-machine function for service through the VM-hypervisor intermediary. Either virtual machine may be a pageable guest of the VM operating system.

In its native environment, the machine function must occupy fixed real storage. In contrast, via the facilities of the present invention, the transformed function is pageable in its virtual-machine form. The virtualization of the machine function code in pageable storage provides VM the flexibility of emulating multiple large Parallel Sysplex systems within a single CEC or logical partition, without exceeding the physical storage of the computing system and without intersystem-coupling hardware.

In accordance with an embodiment of the present invention, VM in effect provides a virtual multiple-physical-system environment in a single physical system. Yet, in a very real sense, the same logical isolation exists among the interacting virtual machines (and, indeed, among the entire separate virtual Parallel Sysplex systems in the user's test environment) as if they were in physically different machines.

In order to make the hardware machine function available in a virtual embodiment, the function is transformed from its stored form in the SE to a virtual-memory-addressable form in a virtual machine. Via a further feature of the invention, calls for the services of the transformed hardware machine function are interpreted by a new service layer provided for this purpose in VM. In this test scenario, such calls are made by the using programs running in their own virtual machines and are relayed through this VM service layer to the transformed machine function, residing in another virtual machine of the VM operating system.

In accordance with the present invention, the VM service layer emulates the native hardware-to-microcode interface of the machine function in the virtual-machine-to-virtual-machine communication, from the program requesting service in one virtual machine to the CFCC in another virtual machine which provides the requested service.

The transformation of the CF function from SE storage to the virtual-machine domain entails the transfer of the binary image of the CFCC from the private DASD of the SE to addressable virtual pages within the address space of one or more encapsulated virtual machines in which the virtual embodiment of the function is to reside.

The interface defined for any request to the SE is a Service Call (SERVC) instruction which causes the SE to be signalled by a main processor of the CEC. The instruction format provides fields that are used to specify the action, and parameters of that action, being requested of the SE.

In the present invention the SERVC instruction to establish a virtual copy of a hardware--machine function in a virtual machine specifies the function to be virtualized (i.e., the Coupling Facility function in a preferred embodiment) and the main storage locations in which the code providing the function must be placed. As a parameter of the SERVC, an address list is provided by VM to the SE.

In the SE environment, the address list is a two-level list of real main-storage locations in virtual-address order of the pages (4096-byte blocks) of an address space into which the CFCC is to be placed. Each entry in the list represents a page in the encapsulated virtual-machine(s) virtual address space. The SE transfers the bytes of the functional image of the CFCC in pages consecutively, from the beginning of the CFCC in the SE storage, to the real-page-frame locations in the main storage of the CEC, using the real addresses supplied as a part of each entry in the supplied address list. The interface includes a starting offset within the virtual address space. This offset can be used by VM to request the proper placement of the machine function within the virtual address space of the encapsulated virtual machine in which it will operate.

Since the machine function must be addressable within a virtual machine after its transformation from SE storage, the interface selected is modeled on the Dynamic Address Table (DAT) structure through which the main processors of the CEC access virtual-address locations, including the CFCC when it is in operation after being established in a virtual machine.

Accordingly, through the present invention, the aforementioned two-level address list is defined for the transformation of the machine function into the virtual-address environment. For operation of the virtual machine, the DAT tables must be in the main storage of the CEC or logical partition. For SE use, a copy of the specified DAT tables is transferred to the SE private storage for use in performing the transformation operation. From the standpoint of the SE, each entry in a first table of main storage addresses is an address of a second table that holds 1024 real-page-frame addresses. After pages of the CFCC have been transferred to main storage using the applicable addresses in the applicable second table, the SE advances to the next entry in the first table to find a new second table containing real-page-frame addresses for the next consecutive portion of the CFCC. To the SE, only the real addresses and the page-frame-validity bits in the table entries are meaningful, and any other portions of these tables are ignored.

In the VM environment, these tables are, precisely, the DAT Segment and Page Tables established and pre-allocated to define the virtual machine that is to contain the hardware-machine function. All virtual pages must be backed by real-storage frames during any request to the SE for virtualization of a machine function. After the transfer is complete, VM may migrate less-frequently-used pages of the function to its direct access storage device (DASD) page space in its normal storage-management operations. Completion of the SERVC instruction is signalled to VM by the SE by means of a hardware interruption. Facilities are provided for VM to check the completion status of the requested service call.

Via a further inventive feature herein a related SERVC function allows an operating system in the CEC to request the length of the microcode for any virtualizable hardware machine function so that the operating system may properly prepare for the transformation request by building a two-level table specifying enough virtual storage, and locking enough real-page frames, to contain the function.

In yet another inventive feature, a related SERVC function allows an operating system to request that one of the previously-described functions be halted before completion, should the need arise (as, for example, if a virtual machine receiving a transformed function is reset by a user control).

BRIEF DESCRIPTION OF DRAWINGS

The subject matter which is regarded as the invention is particularly pointed out and distinctly claimed at the conclusion of the specification. The foregoing as well as other features and advantages of the invention will be apparent from the following detailed description in conjunction with the accompanying drawings, in which:

FIG. 5a depicts the resulting relationship between the virtual address space of the encapsulated virtual machine and the page frames in the main storage of VM after the hardware machine function is transferred from the SE storage;

DETAILED DESCRIPTION OF THE PREFERRED EMBODIMENT OF THE INVENTION

While the present invention will be described via reference to a preferred embodiment wherein a CF function, implemented as CFCC (and referred to herein as function F1), is transferred from SE storage to an encapsulated virtual machine in a CEC, to provide a virtualized hardware-machine function of a Parallel Sysplex Coupling Facility, it will be understood that other machine functions typically embodied in hardware machines may be transformed to operate within a virtual machine through the same techniques described herein.

Figure 1:
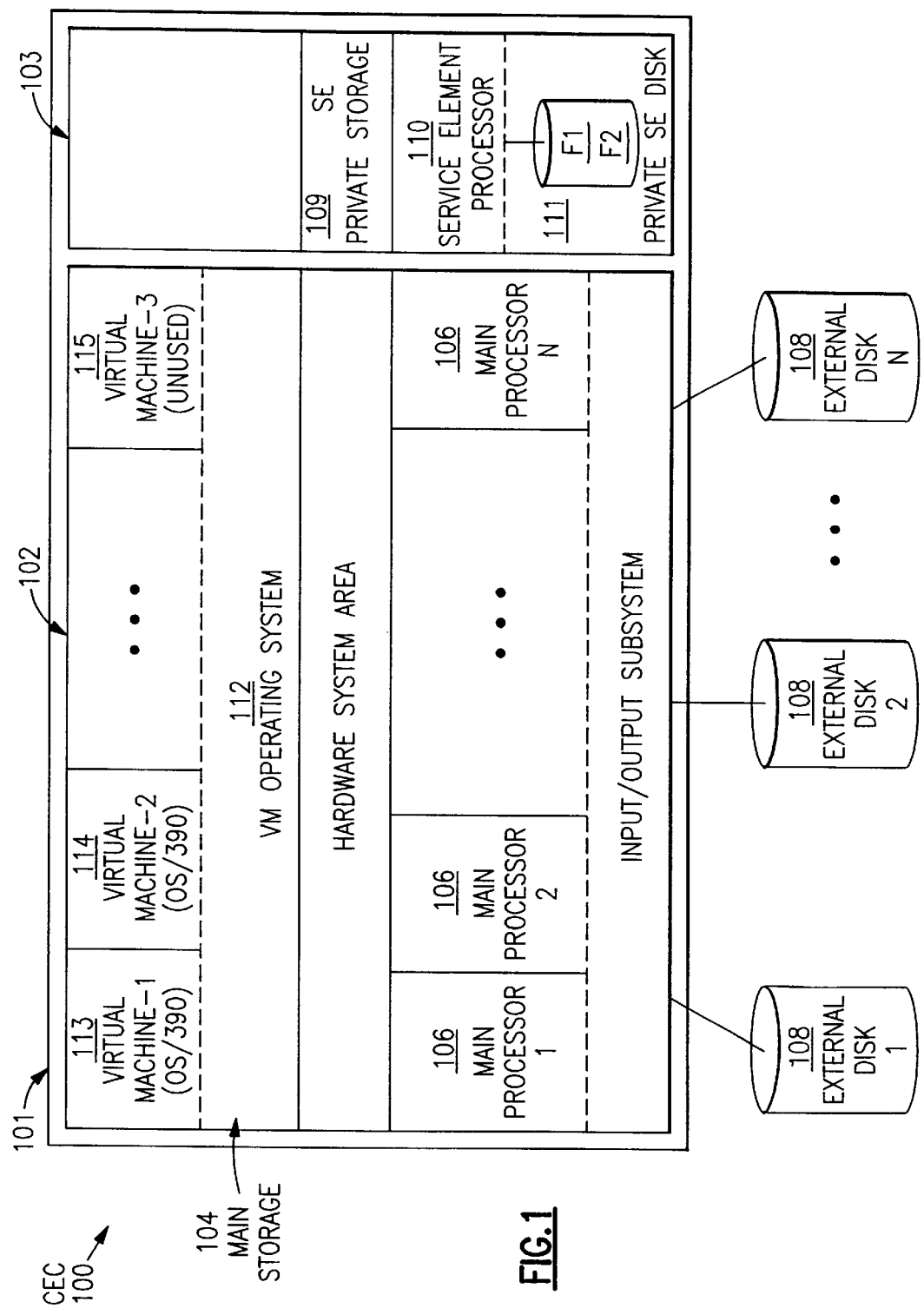
FIG. 1 shows the major elements of the system in which the invention operates.

FIG. 1 depicts the major elements of a single physical or logical computing system (CEC or logical partition thereof), in which the invention operates. The region bounded by box 101 incorporates all of the required elements of the functional computing system. The interior region bounded by box 102 represents the elements of the system that are directly user-programmable. These user-programmable elements are controlled by an operating system 112 to run programs supported thereby. The interior region bounded by box 103 represents the separate operational domain of the SE. The SE domain 103, which is not accessible by users, serves to monitor the main functional part of the computing system 102. The SE provides the machine-operator interface and performs selected tasks on request from the operating system 112. Since the SE 103 contains a separate processor 110 of its own, these tasks are generally performed asynchronously to the computation on the main processors 106 of the system 102.

The SE processor 110 contains its own private electronic system storage 109 to hold the programs executing on the SE processor 110 and the data required for their computation. The SE also contains private disk storage 111 to hold additional programs and data. The architecture of the SE processor 110 need not be, and usually is not, identical to the architecture of the main processors 106. In fact, the SE architecture may be quite different from that of the main system 102. In such instances the programs and data of each part of the system 101, i.e., the SE 103 and main functional part 102, may be isolated to their respective portions of the system 101. Consequently, these incompatible machine portions are provided with a facility whereby they may exchange specifically-designed requests and responses between each other.

Notwithstanding this functional incompatibility, the main storage 104 of the system 102 is accessible to the SE 103 through a defined interface which enables the performance of the SE services. The private electronic storage 109 and disk storage 111 of the SE 103, however, cannot be directly accessed by the programs executing in the main storage 104 of the system 102.

A Service Call (SERVC) instruction is defined as the interface from the main functional part of the system 102 to the SE 103, to request that certain services be performed. Such a request is communicated to the SE through the hardware and microcode elements of the system 102. The SE reports the completion of such a request by means of a service-signal external interruption to the operating system 112.

The main disk storage of the computing system is illustrated by 108.

In a preferred embodiment of this invention illustrated herein, the operating system of interest is the IBM VM/ESA (VM) operating system 112. The VM operating system functions as a so-called "hypervisor" which supervises the function and interaction of other operating systems. VM establishes virtual machines, such as the illustrated virtual machines 113, 114, and 115, which perform their computation within the access boundaries set by the VM hypervisor. Each virtual machine contains a "guest" operating system having the view of being the sole occupant of a system of its own with the imposed boundaries of storage, devices, etc.

The creation of this simulated view of each virtual machine occupying a separate unique computing system is created for these guest operating systems by the virtualization provided by VM through its management of available system-architecture facilities, implemented in the hardware and microcode, to accomplish guest separation and isolation.

The SE disk storage is shown as containing a set of functions, here labelled F1 and F2 for purposes of illustration. These functions are stored in proprietary microcode designed to execute in the programmable main storage of the system, usually loaded there by the SE only in specific, defined, and restricted natively-executing environments. In order to be established in a virtual machine of the VM operating system, a function must be transformed from its stored form on the private disk of the SE into real page frames in the main storage of the system, addressable by VM as one of its virtual machines through the virtual address spaces associated with the virtual machine.

In operation, VM issues a SERVC instruction to initiate a request for such a function transformation from SE storage to virtual machine storage. A program in the SE reads the binary form of the requested function from the private disk 111 to the electronic storage 109 of the SE, after which the SE maps the binary image into page frames and transfers the pages to the requested real page-frames in main storage. After the requested transfer is completed, the SE generates a service-signal interruption to notify VM that the transformation operation is finished. This process is explained in more detail below.

The virtual machine depicted as virtual machine-3 115 is identified as the virtual machine to utilize the CFCC.

Figure 1A:
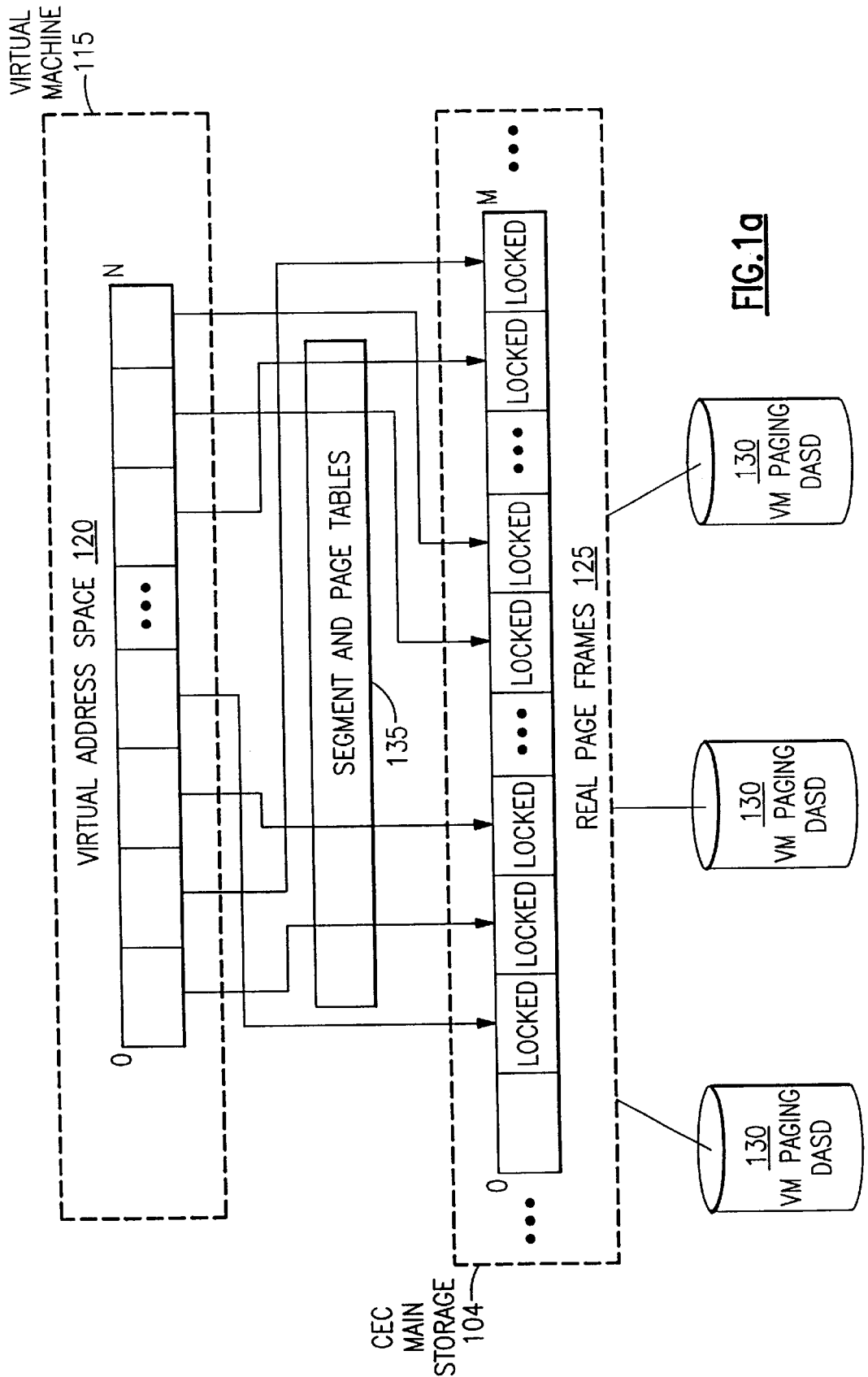
FIG. 1a illustrates the association between the virtual address space of a virtual machine which is to perform the virtualized hardware machine function and the pre-allocated real page frames of main storage which receive the code for the virtualized machine function, as mapped through the Segment and Page Tables.

Accordingly, as can be seen by reference to FIG. 1a, the virtual address space 120 of virtual machine-3 115 is pre-allocated so as to correspond to real page-frames 125 in the CEC main storage 104. The mapping of the contiguous virtual address spaces 120 to the non-contiguous real page-frames 125 is enabled via the Segment and Page Tables 130 and associated Dynamic Address Translation (DAT) hardware. These pre-allocated page frames 125 in the CEC main storage are reserved (or locked) for the subsequent receipt of the CFCC from the SE and will not be paged out to VM paging storage 130 or moved to another portion of CEC main storage as part of the VM system's normal memory-management operations.

Figure 2:
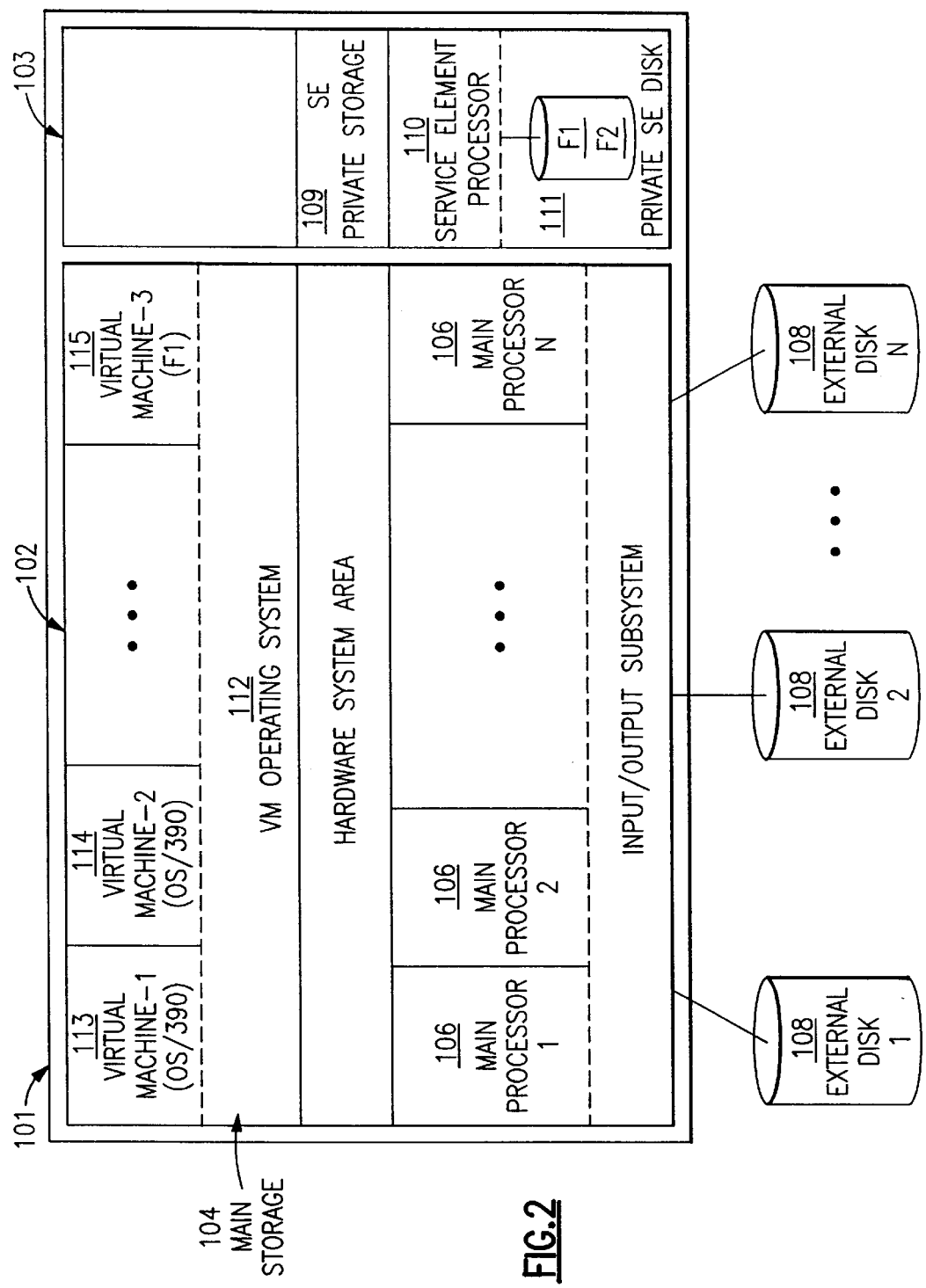
FIG. 2 illustrates the virtual-machine structure resulting from use of the invention.

FIG. 2 depicts the system operational situation after the transformation operation is complete. The requested hardware function (i.e., F1) is established in the virtual machine 115 as requested by VM. The OS/390 operating systems in virtual machines 113 and 114 can issue requests for service from function F1 using the same invocation and communication protocols as in the native, or non-virtual-machine, environment (OS/390 is a trademark of IBM). In other words, the OS/390 virtual machines issue requests to the virtual machine running hardware function F1 as if they were requesting service from a physical hardware machine or logical partition.

VM intercepts these requests and relays them to function F1, emulating the usual hardware interface for an intersystem transfer of information. The code of function F1 operates normally on the request, and then replies using the normal logical interface. VM again intercepts, and emulates the intersystem communication back to the requesting guest operating system. This allows customers to create a testing environment for the use of function F1 in a single hardware system even though the operation of function F1 is normally restricted to execution in an unshared hardware system or logical partition of its own. While providing this facility, the virtual-machine structure maintains the necessary isolation among guest operating systems, as would be the case in the physically- or logically-separate hardware-machine implementation and protects the proprietary nature of the code underlying the implementation of function F1.

The protection of the proprietary implementation of F1 derives from the creation of a new class of encapsulated virtual machines in VM. Whereas normal virtual machines in VM are available for logon and full use by the user, this new class of virtual machine disallows logon and regular use. There is no access to the encapsulated virtual machine 115 containing the function F1 except through defined programmed calls for service from other virtual machines (113, 114) and user commands entered through other virtual machines, each of which is routed through VM and, if allowable, passed to the function F1 on virtual machine-3 115 for processing.

VM-system commands to act on and within an encapsulated virtual machine are not accepted. Furthermore, requests for the services of the encapsulated virtual machine are used to trigger testing by the VM hypervisor of the virtual machine's environment to ensure that the integrity of the virtual machine's encapsulation has not been violated.

In FIG. 2, the virtual machines 113–115 are depicted as physically residing above the storage 104 to indicate that they are addressed through the use of virtual addresses and all of their pages may not be backed by real page-frames in main storage 104 at all times.

Figure 3:
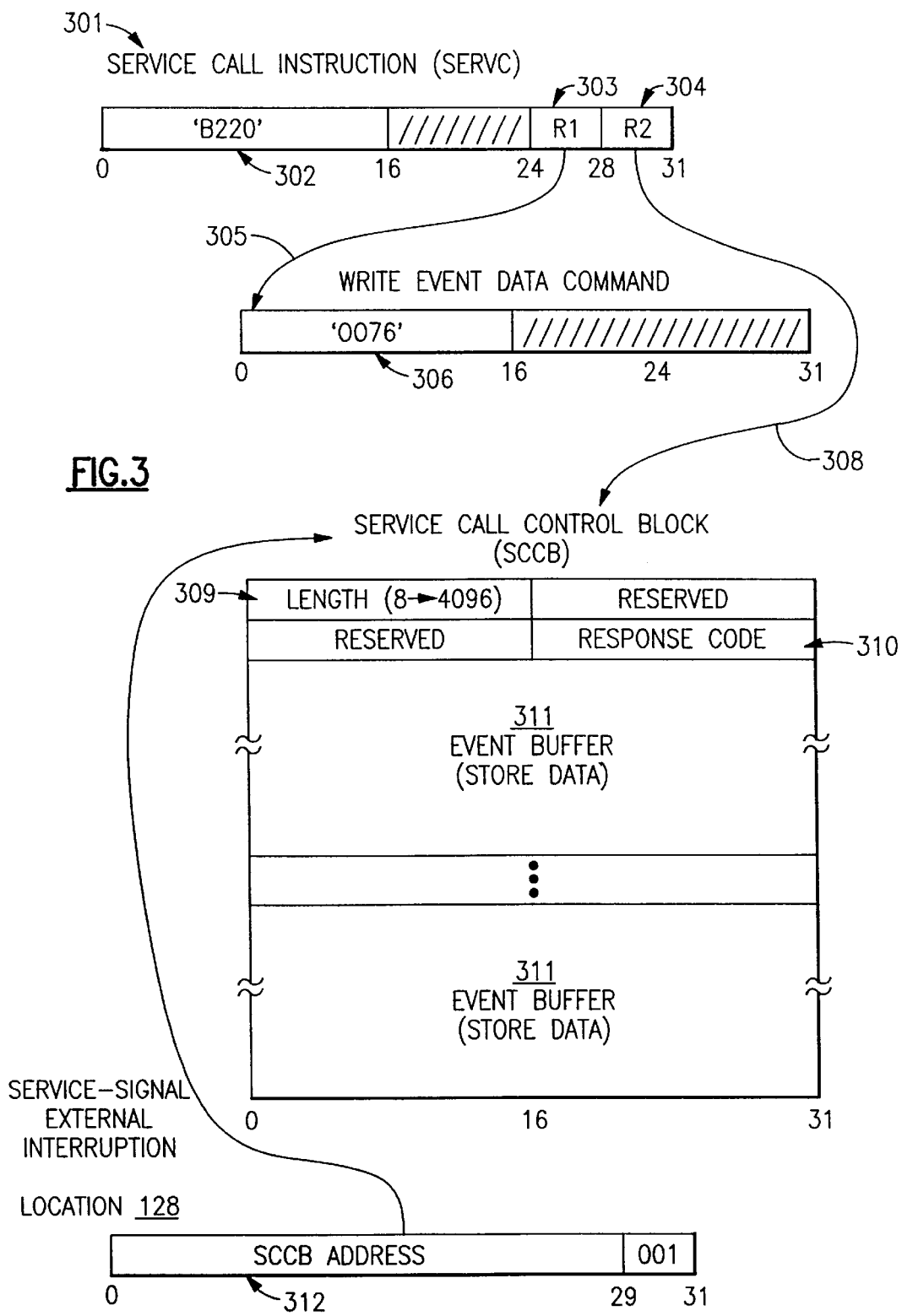
FIG. 3 depicts the interface structure for a call to the Service Element to request establishment of a programmed hardware-machine function in a virtual machine of the VM operating system.

FIG. 3 depicts the format of the SERVC instruction and the control blocks involved in its execution. The instruction is issued by the VM hypervisor, residing in the main storage of the computing system and running on the main processors of the CEC. The instruction can be issued only by a privileged program such as an operating system. The SERVC instruction requests a service from the SE. The instruction 301 has an operation code 302 that identifies it as a SERVC instruction and also has parameter areas 303 and 304 designating two general-purpose registers, R1 and R2, respectively.

Register R1 contains a Write Event Data command 305. The Write Event Data command is defined by the command code '0076' (306) and specifies that VM is providing data to the SE in this instruction-execution instance. Register R2 contains the address of a Service Call Control Block 308 (SCCB). This block contains at least one Event Buffer 311 which contains the data to be transferred to the SE for processing. The control block contains a length field 309 that indicates the total length of the SCCB, including the Event Buffer(s) in this instance of the control block.

The address of the SCCB is reported back to VM when the SE has completed processing or has accepted the request for processing over an extended period. This reporting is done through a defined location in the main storage of the system, set by the SE upon the presentation of a service-signal interruption to VM, to indicate the SCCB that has been completed or accepted for asynchronous processing. In FIG. 3 this is indicated as main-storage location 128 (312), which is specific to an S/390 embodiment. The low order three bits of the SCCB address 312 are implied as zeros. The SE supplies a response code 310 in the SCCB to indicate normal completion or the existence of certain problems with the processing of the SCCB.

For purposes of the preferred embodiment, the successful completion of the SERVC instruction means that the SE has accepted the command request for execution in its own operating domain, asynchronously to the operations of the main processors (and the operating system) of the computing system. At this point the storage occupied by the SCCB is available for re-use by VM, as the SE has extracted all of the information it needs. Final completion of the requested operation is signaled to VM by another service-signal interruption generated by the SE. This may occur at a much later time.

Figure 4:
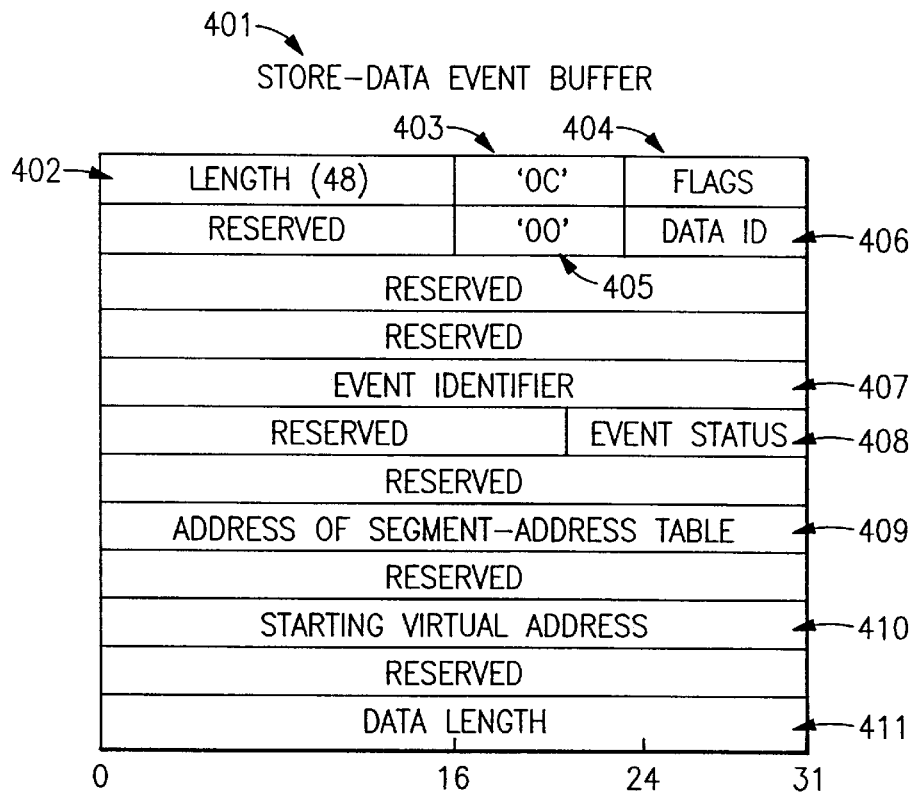
FIG. 4 shows the detail of the Store-Data Event Buffer portion of the Service Call Control Block for a request to transform and load a microcode-based hardware machine function from SE storage into a virtual machine of VM.

FIG. 4 depicts a detailed view of the format of a Store-Data Event Buffer 401 (depicted as 311 in FIG. 3) for the case of interest here, namely a request to the SE to transform a hardware-machine function (i.e., F1) from the SE storage domain to the main-storage page frames specified in the request, in such a way as to make the hardware machine function directly and immediately executable in a virtual machine of VM. This transformation makes it possible for VM to use its simulation of communication functions to forward to the virtual machine containing function F1 any requests for its services from guest operating systems in other virtual machines.

A length field 402 indicates the length of the information in the buffer, which is 48 bytes in the case of requests related to the transformation of a hardware-machine function. The store data request is indicated in field 403. The Event Qualifier field 405 specifies that a function transformation is requested, while the Data Identifier field 406 identifies the function to be transformed. In this example a Data Identifier of 00 in field 406 indicates function F1 for the transformation operation.

The address of the first table to be used in the transfer of bytes to main storage is provided in field 409. This is the Segment Table of the virtual address space that will hold the requested function in main storage, but it is only the first table of a two-level address table in the SE operation. The starting offset 410 within the virtual address space specified by the two-level table is also provided. The SE uses this offset to identify the table entry for the real page-frame to receive the first page of the function to be virtualized. On the VM side, this offset is the starting virtual address within the assigned virtual machine for the beginning of the function, which allows VM to place the code of the function anywhere within the virtual-machine storage. The Data Length field 411 indicates the total length in bytes of the code expected to be transferred from the SE to main storage. The Event Identifier 407 is supplied by VM, kept by the SE throughout its processing, and returned to VM with completion status so VM can tie the completion status to the original asynchronous request. The Event Status field 408 contains an appropriate code to indicate the ending status of the requested operation as reported by the SE.

Figure 5:
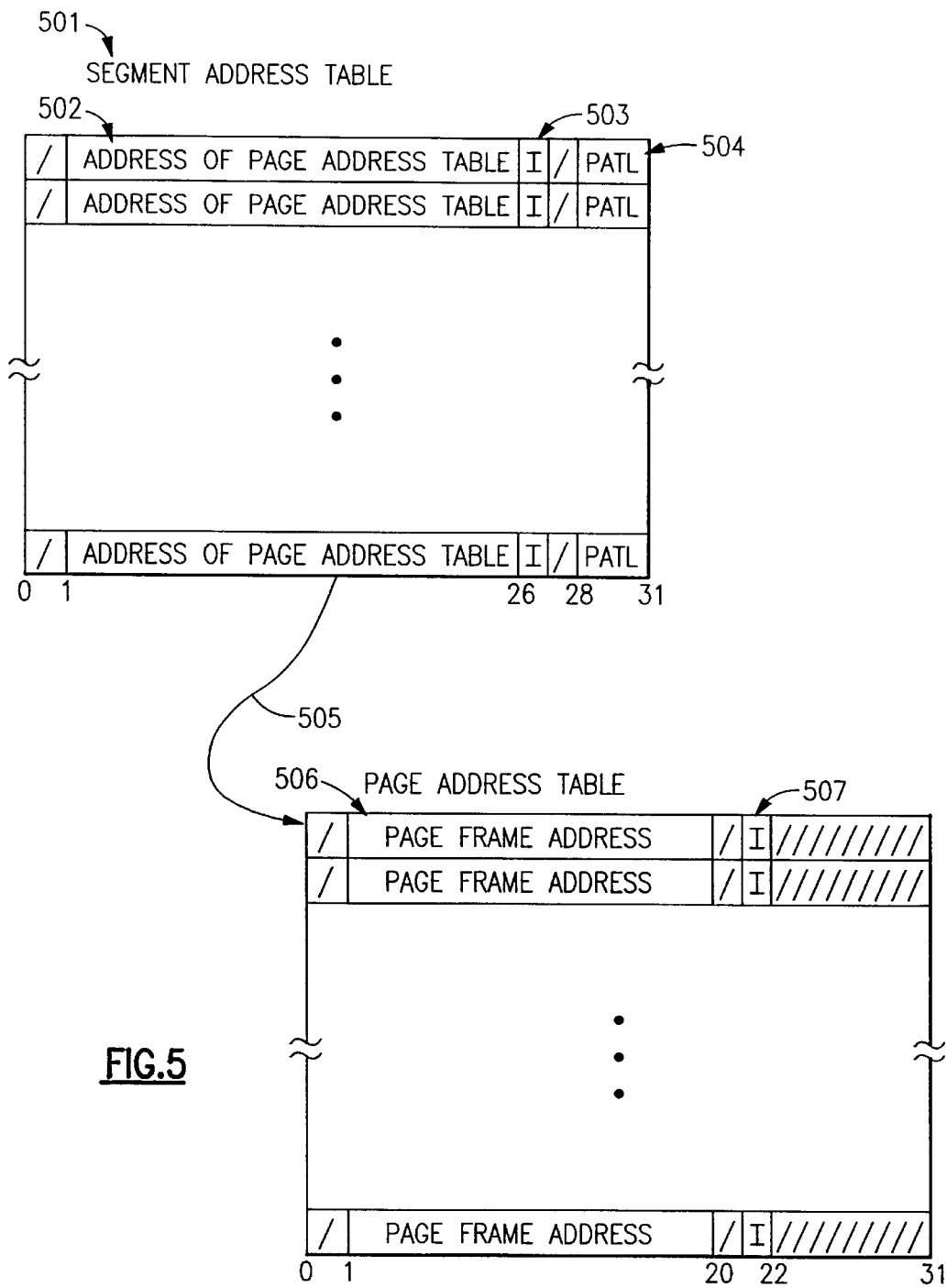
FIG. 5 illustrates the Segment and Page Tables that define the virtual-to-real storage-address mapping for virtual-address spaces, and which are copied for use by the SE as a two-level address list for loading the requested machine-function code at the requested offset within the encapsulated virtual machine to be occupied by the function.

FIG. 5 depicts the structure of the two-level address list provided by VM and used by the SE for transferring the code of the requested function from the SE to the main storage of the computing system. In main storage the address list comprises the Segment Table 501 (ST) and the Page Tables 505 (PT), one of which is depicted in the figure. When transferred to the SE, the ST and PT are processed as a simple two-level access list. Only the "invalid" (I) bit in each table, 503 in the ST and 507 in the PT, are tested by the SE to check that each entry contains a valid real address for the data-transfer operation. Each ST entry contains the address 502 of a PT as well as the length 504 of the PT. Each PT entry contains the real-page-frame address 506 into which the next sequential page of the code for the requested function is to be transferred. Where the total length of the expected transfer is not a factor, each PT contains 1024 real-page-frame addresses, used in sequence by the SE to transfer pages to main storage. When finished with one PT, the SE returns to the ST for its next entry, containing the address of the next PT, and continues as above to transfer additional sequential code-pages of the requested function.

FIG. 5a depicts the CFCC virtual address space and the corresponding CEC main storage after the completion of the loading process described via reference to the ST and PT in FIG. 5. By reference to FIG. 5a, which is identical to FIG. 1a, it will now be observed that as a function of the loading process described above, the pre-allocated real-page-frames 125 in CEC main storage 104 now contain respective portions of the CFCC as transferred from the SE. It will further be noted that while the CFCC was stored in a contiguous fashion in SE main storage it is now stored in a non-contiguous fashion in the page frames 125 of CEC main storage 104 and mapped via the Segment and Page Tables 130 to the contiguous pre-allocated virtual address space 120 of the virtual machine 115.

Figure 6:
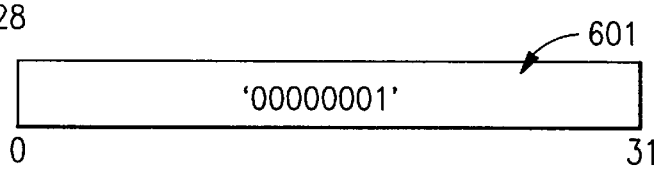
FIG. 6 depicts real-location 128 in CEC main storage, which is used in an S/390 embodiment of the invention to feed back information from the SE to VM about a completed or terminated request for a hardware-machine-function transformation into virtual storage; real-location 128 is shown herein as it would be on the service-call external interruption after a request for hardware-function transformation is completed.

The transformation request originated with the SERVC instruction depicted in FIG. 3. The request was acknowledged by a service-signal external interruption, at which time location 128 (312) received the address of the SCCB of the request being acknowledged. This communication from the SE means that it accepted the request and is executing it in the SE's own domain, asynchronously to operations of the main processors of the system. When the requested task is completed, the SE generates a second service-signal interruption to indicate that the entire request has been fulfilled. At this time location 128 is set to 00000001 (601 in FIG. 6) as part of the interruption report. This tells the operating system to request a report from the SE containing details of the operation just finished.

Figure 7:
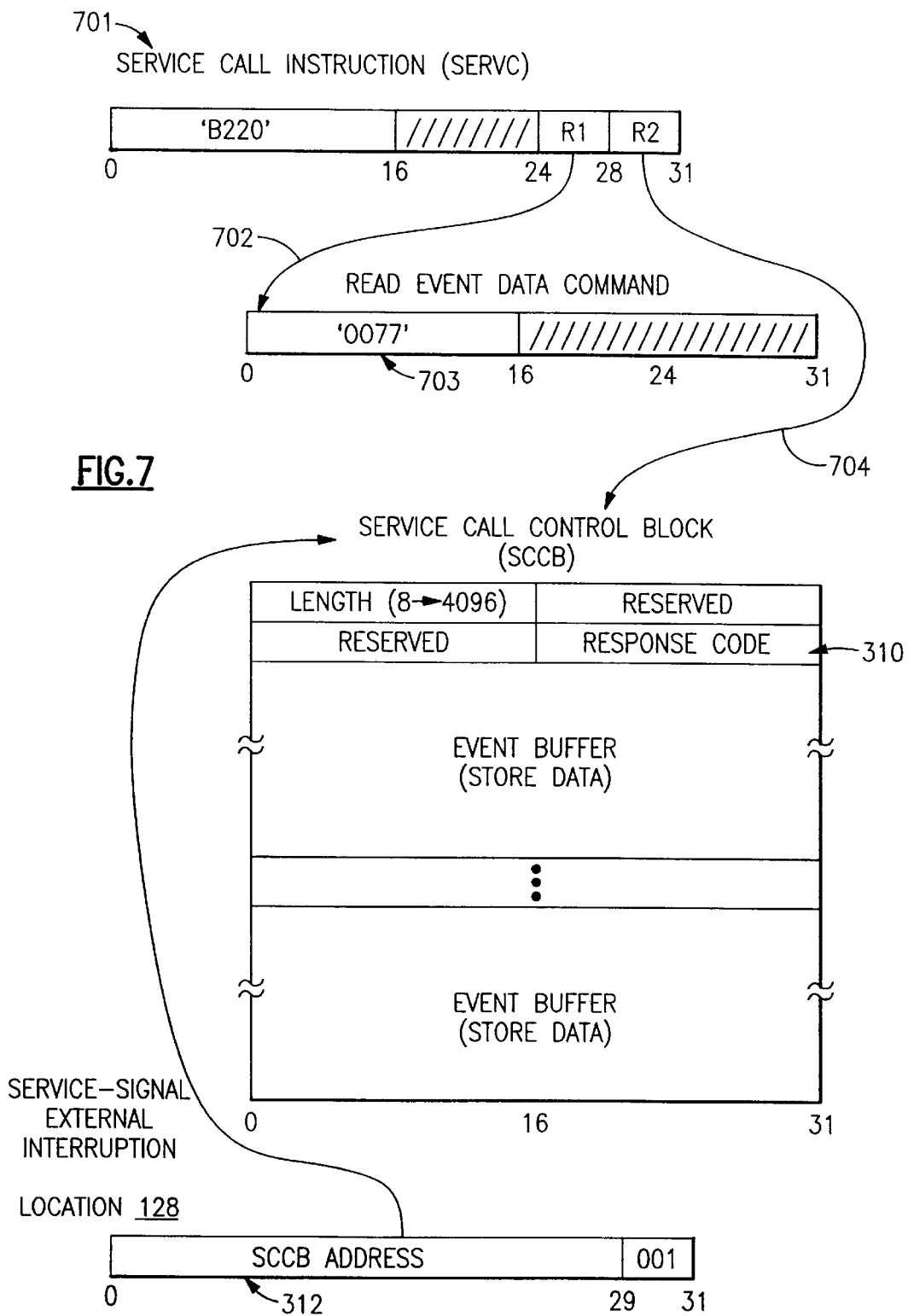
FIG. 7 shows the SERVC instruction interface for a request from VM to the SE for information feedback on a completed SE operation.

FIG. 7 illustrates the request for a report on the just-completed operation, using another SERVC instruction 701. In this SERVC instruction, the register designated as R1 contains a Read Event Data command 702, defined by the command code '0077' (703), requesting the SE to provide information back to the VM operating system. The register designated as R2 addresses a main-storage location in the format of an SCCB 704 that is to receive data from the SE providing the information requested. The SE returns the Event Identifier from the SCCB of the original SERVC instruction that initiated the asynchronous request (as depicted in FIG. 3, using the Write Event Data command 305), plus information about the just-completed operation.

In a similar manner as in the completion of the first SCCB operation described above, the address of the current SCCB is reported back to VM when the SE has completed processing. This reporting is done through main-storage location 128 (312 in FIG. 7), which is set by the SE upon the presentation of a service-signal interruption to VM.

Figures 8, 10:
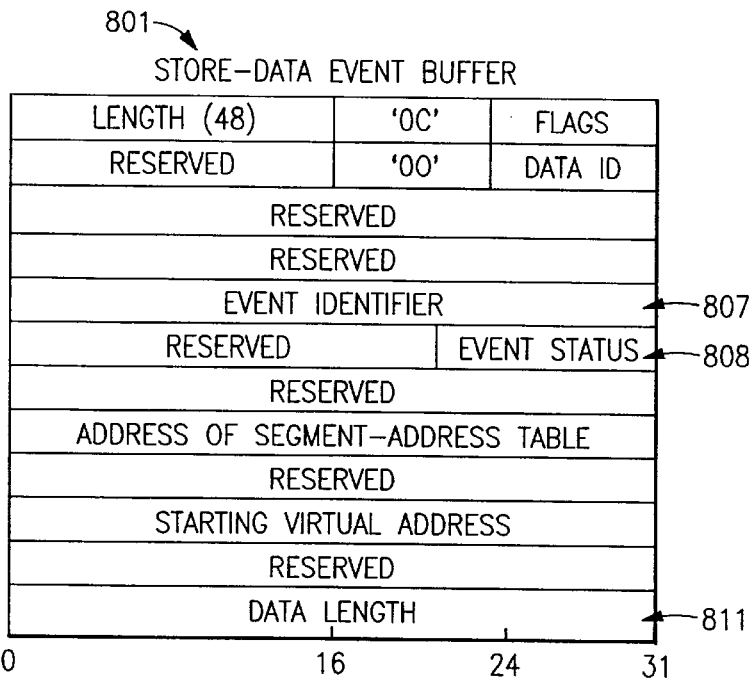
FIG. 8 shows the detailed information in the Store-Data Event Buffer fed back by the SE in response to such a request for information about a completed operation.
FIG. 10 illustrates a portion of a VM directory entry including virtual machine names and associated virtual machine designations.

The detail of the Event Buffer section of the SCCB, describing the completion of the original function-transformation request, is depicted in FIG. 8. When the SE stores the Event Identifier 407 of the original transformation request into the event buffer 801 now requesting details of the completed operation, the SE also supplies content to the fields 310 (in FIG. 7) for response code and 808 (in FIG. 8) for event status, which respectively describe the type of completion and ending status of the function transformation operation. The SE supplies the actual length of the transformed function in field 811.

The SE provides a related function in support of the function-transformation service. The SE allows the operating system to request the size in pages of the program code for a transformable hardware function so that the operating system can properly prepare the two-level address list as in FIG. 5, assign the necessary real page-frames for the function as in FIG. 1a, and supply the length back to the SE in the transformation request (in field 411 in the Store-Data Event Buffer in FIG. 4). To do this, the same sequence of operations is performed. A SERVC instruction is issued from the CEC to the SE to request the size of the machine function as it will reside in virtual storage; this time the operating system provides a code of '02' in field 405 of the Store-Data Event Buffer of FIG. 4. Then the service-signal interruption from the SE acknowledges receipt of the request. A later service-signal interruption is generated by the SE when the SE has the information to return. As before, a second SERVC instruction obtains the final status of the original request, in this case reporting the size of the machine function. The size appears in field 811 of the Event Buffer in FIG. 8. In this sequence, the fields 409, 410, and the initial content of 411 are ignored by the SE since they have no meaning as inputs to this function.

Once the length of the machine-function code has been provided back from the SE to the VM operating system, VM may request portions of the code for evaluation without transferring the entire length of the machine-function code to the main storage of the CEC.

For example, in setting up the virtualized Parallel Sysplex system an initial determination must be made as to whether the CFCC code stored in the SE is the appropriate version and level for use with the executing version and level of VM. This information about the version and level is traditionally stored in a fixed location in the first segment of the CFCC code. Since the code is stored in a contiguous fashion in the SE, and since the length of the entire code may be provided to the operating system of the CEC as described above, it is possible to request the transfer of only the relevant portion of the code to ascertain the desired characteristics of the code prior to the transfer of the entire length of the machine-function code. It will be understood that the request and subsequent transfer of a portion of the CFCC would proceed in the precise manner as described for the transfer of the entire length of the CFCC.

The SE also allows the operating system to request the early termination of the above-described requests. A request to halt the transformation of a machine function or a request for the size of a machine function is made through the SERVC instruction and an SCCB, as with the original request being halted. In this case, in order to request early termination of the transformation request, the operating system provides a code of '01' in field 405 of the Store Data Event Buffer of FIG. 4. The service-signal interruption reports the final status of the halt request without the need for another SERVC instruction to obtain the final status, since the SE can perform the halt operation with relative immediacy.

Upon successful transformation of a hardware machine function from the SE to the CEC main storage 104, the virtual machines within the single hardware machine or logical partition may be utilized to simulate the separate machine-level interactions with the transformed hardware function through the VM hypervisor. The hypervisor provides a service layer to simulate the intersystem processing of the separate hardware machines and additionally restricts access to the "encapsulated" virtual machines including the transformed machine function to protect the proprietary code therein as well as to ensure its error-free operation.

Figure 9:
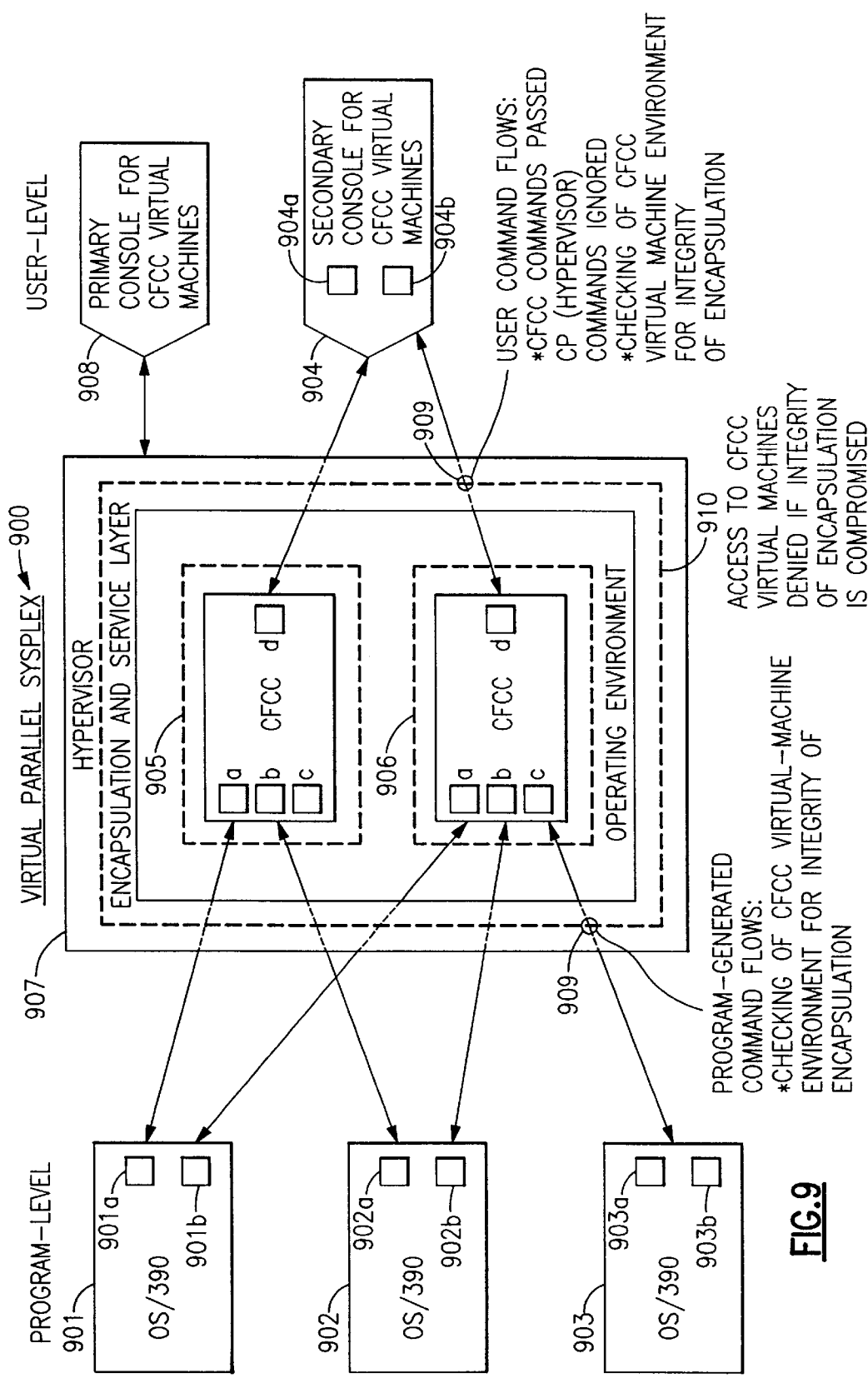
FIG. 9 depicts the operation of a virtualized Parallel Sysplex computing system after transforming the hardware machine function code to operate in virtual machines.

FIG. 9 represents the implementation, within a single hardware machine or logical partition, of a virtual Parallel Sysplex system 900 which is the result of a successful code transformation operation. In the figure, the designated user-accessible virtual machines 901–903, as we will subsequently illustrate, are defined in the VM directory to interact through the VM hypervisor encapsulation and service layer 907 with the designated encapsulated virtual machines 905–906 which are also defined in the VM directory and which include the transformed machine function (i.e., the CFCC, or F1, 115 in FIG. 2). The virtualized CFs in designated virtual machines 905–906 can be accessed by programs running on the designated user-accessible virtual machines 901–903 and via user generated commands issued at secondary consoles such as 904 through these machines 901–903 or other so-designated virtual machines.

FIG. 9 illustrates that the designated user-accessible virtual machines 901–903 issue requests to and receive responses from the designated encapsulated virtual machines 905–906 via programs running thereon and seeking to access the virtualized CF function. Moreover, on secondary console 904 a user may issue requests and receive responses from the encapsulated virtual machines 905–906 via a designated virtual machine associated with the secondary console 904. It will be understood herein that secondary-console user-level access and a program-level access may be made from the same or different designated virtual machines.

As a function of encapsulation of the virtual machines 905–906, only certain types of requests are processed with respect to these machines. Referring again to FIG. 9 we see that any attempt to logon to the designated encapsulated virtual machines from the primary consoles 908 associated with these machines (i.e. primary console access) through the encapsulation function within the hypervisor 907 is not permitted. Moreover, access by a user through secondary console 904 through one of the designated user-accessible virtual machines is restricted to user-generated CFCC-compatible commands. That is, if a user attempts to access the environments of the CFCC virtual machines 905–906 using a system-level (i.e., hypervisor) command, or for that matter any command that is not compatible with the CFCC, such a request is not processed by the VM hypervisor or the CFCC virtual machines. Likewise, only program-level requests for service from the CFCC that are issued by designated user-accessible virtual machines such as 901–903 are processed by the hypervisor and the CFCC virtual machines 905–906. Any other program-generated request from a virtual machine (designated or otherwise) to the CFCC virtual machines is not processed. In essence, CFCC virtual machines 905–906 are conditioned to function precisely as physically separate Coupling-Facility hardware; as such they may be viewed as single-function machines which can only operate as would the physical Coupling-Facility hardware, and any attempt to interface with these machines in another fashion is ignored or rejected. In order to accurately simulate the interaction of the physically-isolated hardware machines in a physical implementation of a Parallel Sysplex system, the hypervisor provides a service layer 907 which serves to simulate the intersystem links that couple S/390 servers to Coupling Facilities in a Parallel Sysplex system. In operation, a request generated at a designated user-accessible virtual machine (e.g., 901) to one of the CFCC virtual machines (e.g., 905) is identical to a request from a first S/390 server to an S/390 Coupling Facility server over an intersystem channel. The request from the virtualized S/390 server 901 is passed through the VM hypervisor and routed to a logically-separate CF server just as in the physical implementation. The VM hypervisor service layer 907 intercepts the request and forwards it to the target CFCC virtual machine 905 by transferring the data associated with the request from virtual machine 901 memory locations 901a to the memory locations 905a of the CFCC virtual machine 905. Likewise, the response to the request that is subsequently generated by the CFCC virtual machine is identical to the response generated by an actual physical CF. The response is routed from the CFCC virtual machine 905 to a logically-separate virtual machine server 901. The VM hypervisor service layer 907 again intercepts this message and forwards the response to the target virtual machine 901 by transferring the data associated with the response from the memory locations 905a associated with CFCC virtual machine 905 to the memory locations 901a of virtual machine 901. In this manner the service layer 907 permits the virtual machines to interact in an isolated manner identical to the interaction of physically-separate hardware machines in a Parallel Sysplex system.

As a further enhancement of the encapsulation of the virtualized hardware machines in the virtual Parallel Sysplex system, each request for service from the CFCC virtual machines 905–906 triggers a routine 909 running in the hypervisor encapsulation layer 907 to interrogate the operating environment of that CFCC virtual machine for which the request is intended. The interrogation assesses whether the virtual machine has been logged onto as well as whether the operating environment of the machine has in any way been altered (i.e., through surreptitious modifications of part of the VM hypervisor). Such an interrogation is necessary to ensure the continued integrity of the encapsulation of the CFCC virtual machines to protect the proprietary code contained therein as well as to ensure the error-free operation of the virtual machine and to avoid extensive debugging problems. If the interrogation by the hypervisor encapsulation layer 907 determines that the integrity of the encapsulation has been compromised in any way, all access to the CFCC virtual machines is disabled 910.

To better appreciate the encapsulation of a virtual machine we will now refer to FIG. 10 wherein is illustrated a portion of the VM hypervisor directory 1000 for designating the characteristics and capabilities of the virtual machines which embody and/or interact with the transformed machine functions. Each of the defined virtual machines has a name (or user identifier). By reference to FIG. 10 the machine names listed under the virtual-machine name column 1001 are A1, A2, . . . B3. The virtual-machine name is then associated with the capability to contain or access a given type of virtualized machine function, if applicable, via the corresponding entry in the virtual-machine-designation column 1002. Accordingly, we can see that virtual machine A1 is associated with the capability to execute machine function 1 by reference to the virtual-machine-designation column 1002.

The virtual-machine name may be further associated, or instead associated, with the capability to interact with virtual machines embodying a given type of machine function. For example, referring again to FIG. 10 we see that virtual machine A1, which we have previously noted is designated as having the capability of executing machine-function 1, is further designated as having the capability to interact with another virtual machine embodying machine-function 2 (i.e., it is a machine-function-2 user). Consequently it will be appreciated that an encapsulated or protected virtual machine such as the CFCC virtual machines 905–906 may be defined as having the capability to interact with other protected machines.

In the preferred embodiment, program access and user access to any given machine function is implicit; program access is enabled, primary console access is disabled (i.e., user logon is denied), and secondary-console access is for machine-function commands only (i.e., those embodied in the machine function within the virtual machine)— hypervisor system commands are disabled. It will be understood however, that further granularity of access could be specified in the directory. Thus for example, via reference to FIG. 10, virtual machine B1 is shown as having both secondary-console to A1 and A2 and program-level access to virtual machines including machine function 1 (i.e., it has a secondary console for A1 and A2 and is a program-level user of machine function 1), whereas virtual machine B2 is shown as having only program-level access to virtual machines embodying machine function 1 and/or machine function 2. Moreover, it will be understood that in other embodiments intended to be within the scope of the present invention, encapsulated virtual machines incorporating a given machine function may be permitted unrestricted primary-console access, or for that matter a restricted primary-console access to allow only interactions with the machine function or any other level of granularity of primary-console access. It will also be understood that granularity of access within the machine function itself can be specified within the machine function according to techniques that are well known to those of skill in the art, independently of the hypervisor-provided isolation of the machine function in the virtual machine. Thus, for example, virtual machine B1 while designated as a machine function 1 user, could be further restricted to use only a portion of machine function 1 by code within the encapsulated virtual machine(s) embodying machine function 1.

Figure 11:
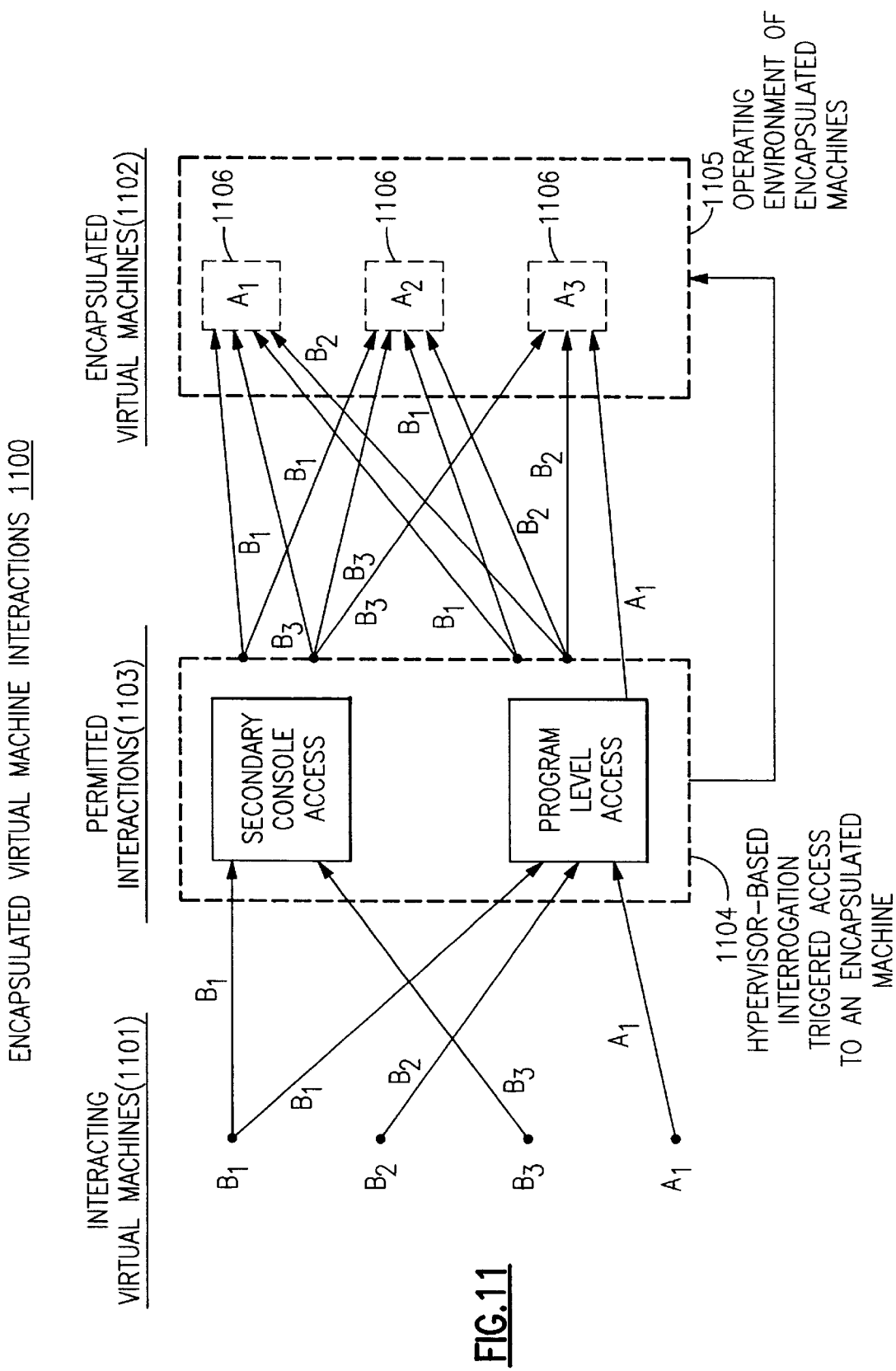
FIG. 11 illustrates a detailed view of the encapsulation of a virtual machine to limit user- and program-level interactions with the virtual machine so as to provide only its hardware-machine operating services to other virtual machines and to protect proprietary code stored therein.

FIG. 11 graphically illustrates the relationships 1100 defined in the tabular hypervisor directory 1000 of FIG. 10. Turning now to FIG. 11 we see that, for example, with regard to the interacting virtual machine 1101 B1, the defined interactions from VM directory 1000 are illustrated by the lines labelled B1 connecting the virtual machine B1 to the encapsulated virtual machines 1102 A1 and A2 (which implement machine function 1) through both the secondary-console interaction path and the program-level interaction path 1103. The same type of inter-relationships may be found with regard to interacting virtual machines B2 and B3. Moreover, encapsulated virtual machine A1 which was indicated in directory 1000 as being a machine-function-2 user is shown as being coupled to encapsulated virtual machine A3 (implementing machine-function 2) via the program-level interaction path. Thus, virtual machine A1 acts as both an encapsulated virtual machine and as an interacting virtual machine with defined levels of interaction permitted between itself and encapsulated virtual machine A3 running machine-function 2.

FIG. 11 further graphically depicts the interrogation of the operating environment of the encapsulated virtual machines 1104. When a defined interacting virtual machine (i.e., B1–B3 and A1) initiates a request for service from a defined encapsulated virtual machine through a designated permitted interaction mode 1103 (i.e., secondary-console or program-level interactions), the hypervisor initiates an interrogation 1104 of the operating environment 1105 of the encapsulated virtual machine with which the interaction has been requested. In general, the interrogation is implemented to determine whether some aspect of the operating environment of that encapsulated virtual machine has been compromised in violation of the protection designated for that encapsulated machine. For example and without limitation, if encapsulated virtual machine A1 was designated so as to forbid user logon via the primary console, when an interacting virtual machine requests service from A1, the interrogation 1104 would determine if the machine has been logged on in violation of that restriction. Likewise, if all or a certain portion(s) of the operating environment of an encapsulated virtual machine 1105 is restricted from being modified by the issuance of all or certain types of system-level commands, the interrogation would actuate upon a request to that encapsulated virtual machine to determine if these restrictions have been violated.

In this manner, the hypervisor continually monitors the integrity of the protected virtual-machine sessions. In the event that an interrogation determines that the operating environment of a requested encapsulated virtual machine has been compromised, the hypervisor is enabled to take further protective actions. Referring back to FIG. 9 it will be recalled that where the interrogation 909 reveals that the integrity of a requested virtual machine has been compromised, all access to all of the encapsulated virtual machines 905–906 is thereafter denied 1106. By reference to FIGS. 10 and 11 it will be understood that such a restriction would require altering the machine designations 1002 for each of the interacting machines 1101 so as to forbid them from interacting with the encapsulated machines 1102. Likewise, it is equally possible to simply restrict any access to the requested encapsulated virtual machine which has been identified by the interrogation as having had its operating environment compromised. In this scenario, all interactions with the compromised encapsulated machine are denied (in FIG. 11 1106 corresponds separately to each of the encapsulated virtual machines), while interactions with the other non-compromised encapsulated virtual machines are still permitted. This feature would require selectively altering the VM directory 1000 to change the entries for only those interacting machines 1101 which had been previously permitted to interact with the compromised encapsulated virtual machine. In this manner the virtualized system may remain partially functional even after a single encapsulated machine is disabled.

It will be further appreciated that while we have confined our present discussion to encapsulation techniques for the protection of the operating environment of virtual machines incorporating a hardware-machine functional code so as to emulate the physically-separate operation of the hardware machine, it is equally possible, using the these same techniques, to isolate any number of virtual-machine sessions implementing any type of program code, if such an isolation for purposes of providing secured access, testing, proprietary-code integrity, or other such purposes is desirable within the computing system.

Though preferred embodiments have been depicted and described in detail herein, it will be apparent to those skilled in the relevant art, both now and in the future, that various modifications, additions, improvements and enhancements may be made without departing from the spirit of the invention, and these are therefore considered to be within the scope of the invention defined in the following claims, which should be construed so as to maintain the proper protection for the invention first disclosed.

Having thus described our invention in detail, what we claim as new and desire to protect by Letters Patent is as follows:

1. In a computer system including a hardware machine having an operating system which supervises a plurality of virtual-machine sessions, a method for protecting the operating environment of one or more of said virtual-machine sessions, the method comprising the steps of:

defining a plurality of session types for said virtual-machine sessions, including a session type of protected virtual-machine sessions, said protected virtual-machine sessions including program code for implementing a service in support of a defined set of interactions, and a session type of corresponding interacting virtual-machine sessions, said interacting virtual-machine sessions being permitted to interact with said protected virtual-machine sessions to request said service therefrom;

defining one or more of said protected virtual-machine sessions within the operating system;

defining one or more of said corresponding interacting virtual-machine sessions within the operating system;

supervising and enabling the occurrence of said interactions between said defined protected virtual-machine sessions and said defined interacting virtual-machine sessions through the operating system; and interrogating the operating environment of said defined protected virtual-machine sessions if said service is requested therefrom to verify the continued integrity of said operating environment.

2. A method according to claim 1 wherein each of said plurality of virtual-machine sessions may be defined as a protected virtual-machine session, or an interacting virtual-machine session, or as both.

3. A method according to claim 1 wherein the step of defining said interacting virtual-machine sessions further includes the step of designating the types of interactions which may be had with the protected virtual-machine sessions.

4. A method according to claim 1 wherein user logon to the defined protected virtual-machine session may be permitted or denied.

5. A method according to claim 4 wherein if user logon to the defined protected virtual-machine session is permitted, the logged-on user may be restricted to a limited set of commands on the defined protected virtual-machine session.

6. A method according to claim 3 wherein said corresponding defined interacting virtual-machine sessions may be granted or denied access to the defined protected virtual-machine sessions.

7. A method according to claim 6 wherein if said corresponding defined interacting virtual-machine sessions are granted access to the defined protected virtual-machine sessions, access may be had to the defined protected virtual-machine sessions via user input commands on the corresponding defined interacting virtual-machine sessions or by requests from programs running on the corresponding defined interacting virtual-machine sessions or by both.

8. A method according to claim 7 wherein the access granted to the defined protected virtual-machine sessions may be restricted to a limited set of commands or requests on the defined protected virtual-machine sessions.

9. A method according to claim 8 wherein any of said corresponding defined interacting virtual-machine sessions may be granted access to one or more of said defined protected virtual-machine sessions and wherein the type of access granted to the one or more defined protected virtual-machine sessions may be different for each one of said one or more defined protected virtual-machine sessions.

10. A method according to claim 9 wherein the services performed by each of said defined protected virtual-machine sessions and the interactions permitted for each of said corresponding defined interacting virtual-machine sessions are stored in a directory.

11. A method according to claim 1 further including the step of defining a set of rules for maintaining the continued integrity of the operating environment for said defined protected virtual-machine sessions.

12. A method according to claim 11 wherein said defined set of rules include rules for permitting or denying user logon to the defined protected virtual-machine sessions and rules regarding whether any portions of the operating environment may be altered.

13. A method according to claim 12 wherein said interrogating step further includes the step of determining if said defined set of rules have been violated.

14. A method according to claim 13 wherein if it is determined that said defined set of rules has been violated, the method further includes the step of restricting all access to all of said defined protected virtual-machine sessions.

15. A method according to claim 13 wherein if it is determined that said defined set of rules has been violated then the method further includes the step of restricting all access to the defined protected virtual-machine session from which service has been requested.

16. In a computer system including a hardware machine having an operating system which supervises a plurality of virtual-machine sessions, an apparatus for protecting the operating environment of one or more of said virtual-machine sessions, the apparatus comprising:

means for defining a plurality of session types for said virtual-machine sessions, including a session type of protected virtual-machine sessions, said protected virtual-machine sessions including program code for implementing a service in support of a defined set of interactions, and a session type of corresponding interacting virtual-machine sessions, said interacting virtual-machine sessions being permitted to interact with said protected virtual-machine sessions to request said service therefrom;

means for defining one or more of said protected virtual-machine sessions within the operating system;

means for defining one or more of said corresponding interacting virtual-machine sessions within the operating system;

means for supervising and enabling the occurrence of said interactions between said defined protected virtual-machine sessions and said defined interacting virtual-machine sessions through the operating system; and means for interrogating the operating environment of said defined protected virtual-machine sessions if said service is requested therefrom to verify the continued integrity of said operating environment.

17. An apparatus according to claim 16 wherein each of said plurality of virtual-machine sessions may be defined as a protected virtual-machine session, or an interacting virtual-machine session, or as both.

18. An apparatus according to claim 16 wherein the means for defining said interacting virtual-machine sessions further includes means for designating the types of interactions which may be had with the protected virtual-machine sessions.

19. An apparatus according to claim 16 wherein user logon to the defined protected virtual-machine session may be permitted or denied and wherein if user logon to the defined protected virtual-machine session is permitted, the logged-on user may be restricted to a limited set of commands on the defined protected virtual-machine session.

20. An apparatus according to claim 18 further including means whereby said corresponding defined interacting virtual-machine sessions may be granted or denied access to the defined protected virtual-machine sessions and wherein if said corresponding defined interacting virtual-machine sessions are granted access to the defined protected virtual-machine sessions, access may be had to the defined protected virtual-machine sessions via user input commands on the corresponding defined interacting virtual-machine sessions or by requests from programs running on the corresponding defined interacting virtual-machine sessions or by both.

21. An apparatus according to claim 20 wherein the access granted to the defined protected virtual-machine sessions may be restricted to a limited set of commands or requests on the defined protected virtual-machine sessions.

22. An apparatus according to claim 21 wherein any of said corresponding defined interacting virtual-machine sessions may be granted access to one or more of said defined protected virtual-machine sessions and wherein the type of access granted to the one or more defined protected virtual-machine sessions may be different for each one of said one or more defined protected virtual-machine sessions.

23. An apparatus according to claim 22 wherein the services performed by each of said defined protected virtual-machine sessions and the interactions permitted for each of said corresponding defined interacting virtual-machine sessions are stored in a directory.

24. An apparatus according to claim 16 further including means for defining a set of rules for maintaining the continued integrity of the operating environment for said defined protected virtual-machine sessions.

25. An apparatus according to claim 24 wherein said means for interrogating determine if said defined set of rules have been violated.

26. An apparatus according to claim 25 wherein if it is determined that said defined set of rules has been violated, all access to all of said defined protected virtual-machine sessions is restricted.

27. An apparatus according to claim 25 wherein if it is determined that said defined set of rules has been violated all access to the defined protected virtual-machine session from which service has been requested is restricted.

* * * * *